(12) United States Patent
Wagner et al.

(10) Patent No.: US 7,100,985 B2
(45) Date of Patent: Sep. 5, 2006

(54) SEAT IN PARTICULAR A VEHICLE SEAT PREFERABLY AN AEROPLANE SEAT

(75) Inventors: Wolfgang Wagner, Friedrichshafen (DE); Jurgen Baumann, Bodman-Ludwigshafen (DE)

(73) Assignee: Recaro Aircraft Seating GmbH & Co., Schwabisch Hall (DE)

( * ) Notice: Subject to any disclaimer, the term of this patent is extended or adjusted under 35 U.S.C. 154(b) by 71 days.

(21) Appl. No.: 10/250,827

(22) PCT Filed: Feb. 8, 2002

(86) PCT No.: PCT/EP02/01310

§ 371 (c)(1),
(2), (4) Date: Jul. 8, 2003

(87) PCT Pub. No.: WO02/066283

PCT Pub. Date: Aug. 29, 2002

(65) Prior Publication Data

US 2004/0051363 A1    Mar. 18, 2004

(30) Foreign Application Priority Data

Feb. 16, 2001  (DE) ................................ 101 07 196

(51) Int. Cl.
*B60N 2/22* (2006.01)
(52) U.S. Cl. ............................... 297/362.11; 297/361.1
(58) Field of Classification Search .......... 297/362.11, 297/354.1, 361.1, 300.1, 300.2
See application file for complete search history.

(56) References Cited

U.S. PATENT DOCUMENTS 3,083,055 A * 3/1963 Davis .................... 297/344.17
4,756,576 A * 7/1988 Bianchi et al. ............. 297/325
4,962,963 A * 10/1990 Robinson ................ 297/362.11
5,088,841 A * 2/1992 Ikegaya et al. ........... 297/344.1
5,360,256 A    11/1994 Miller et al.
5,483,853 A * 1/1996 Moradell et al. ....... 74/665 GD
6,000,757 A * 12/1999 Sovis ....................... 297/344.1
6,237,994 B1 * 5/2001 Bentley et al. .............. 297/118

FOREIGN PATENT DOCUMENTS

| DE | 3335486 | 4/1985 |
|---|---|---|
| DE | 3412047 | 10/1985 |
| DE | 19944620 | 4/2001 |
| EP | 0018274 | 10/1980 |
| FR | 691602 | 10/1930 |
| GB | 1419812 | 12/1975 |

* cited by examiner

*Primary Examiner*—Peter R. Brown
(74) *Attorney, Agent, or Firm*—Roylance, Abrams, Berdo & Goodman, L.L.P.

(57) ABSTRACT

A seat includes a first seat piece (10) and a further seat piece (12), which may be adjusted for inclination by a controllable operating device (14). The operating device (14) engages the further seat piece (12) by at least two adjusters (30), which are moved by a common drive mechanism (34) with a mechanical coupling (36) between the adjusters (30), for an effectively uniform motion. A uniform inclination adjustment of the further seat piece, such as backrest and/or leg rest is achieved. The drive includes an actuator device with a longitudinally displaceable operating piece (40), engaged with a rocker (44), connected to an adjuster piece (30) and operating the mechanical coupling (36), with a further rocker (46), for the other adjuster (30).

16 Claims, 3 Drawing Sheets

SEAT IN PARTICULAR A VEHICLE SEAT PREFERABLY AN AEROPLANE SEAT

FIELD OF THE INVENTION

The present invention relates to a seat, in particular a vehicle seat, preferably an aeroplane seat, with a first seat part, and with another seat part which can be adjusted in tilt by a triggerable actuating means. The actuating means engages the other seat part with at least two adjustment parts which can be moved by a common drive. Uniform movement of the adjustment parts in this respect causes mechanical coupling between them.

BACKGROUND OF THE INVENTION

A pertinent aircraft passenger seat, described in DE 199 44 620, has individual seat components, including a leg rest and a backrest. These seat components can be moved by actuating means which can be triggered by a hand-operated actuating means for adjusting the seat to the requirements of the seat occupant. Hand levers for the seat parts are modeled to the contours of these seat parts as an element of the actuating means, and are combined in one operating part for adjusting the aircraft passenger seat for meaningful adjustment for the seat parts.

In all known tilt adjustment means for seat parts, such as a backrest or leg rest, depending on the actuating and tilt adjustment means used at the time, obstacles can arise since generally the actuating means engages only one point of the backrest and/or leg rest. This single point engagement leads to twisting or torsion of the other seat part to be adjusted in its tilt. Even with minor twisting or torsion, a uniform swivelling motion cannot be achieved with a good feeling of the body for the seat occupant. Also, depending on the adjustment structure being used, in case of a crash, unilateral loading of the actuating means, especially in the form of a servo-drive, occurs. The activating means are often not able to accommodate the forces which suddenly occur.

DE-A-33 35 486 A1 discloses a device for adjusting the height and the tilt of the backrest of the seat, especially of a motor vehicle seat. For selective adjustment of the tilt of a backrest or the height of the entire seat by a single drive spindle, the drive spindle has two spindle parts which each bear a mating non-rotatable bevel wheel to interact with a bevel wheel on the spindles of individual adjustment mechanisms. They are connected non-rotatably only in a certain relative axial position by way of gear rings. In this position, only one mating bevel wheel meshes with the assigned bevel wheel. In the other relative axial position of the two drive spindle parts, the two mating bevel wheels mesh with the assigned bevel wheels, but the non-rotatable connection between the two drive spindle parts is canceled. The known gear approach has a plurality of bevel wheels which fit into one another at a right angle so that the known approach takes up a relatively large amount of construction space on the respective vehicle seat and is accordingly heavy. Furthermore, the approach based on a plurality of individual components is structurally complex and expensive to produce.

DE-A-34 12 047 A1 discloses a generic device for adjusting the tilt of the backrest of a seat, especially for motor vehicles. The seat has a backrest frame with two laterally arranged rotary fittings driven by way of intermediate pinion gears by a drive shaft. The drive shaft is supported in the seat frame and is driven by a synchronous belt drive from a handwheel supported on the front end of the seat frame. As a result, a continuous shaft is not necessary in the backrest, and the handwheel for driving the seat back adjustment is located at a favorable site which is easy to reach. Since synchronous belt drives with their drive wheels and shafts are fundamentally subject to a certain slip behavior, there is no smooth and uniform triggering of the adjustment motion on the two lengthwise sides of the backrest, and obstacles in operation must be expected. Furthermore, the known and aforementioned approaches have the disadvantage that they are hardly suitable for reliably accommodating the peak loads which occur in the seat base structure in case of a crash, if it is used in the vehicle domain, especially in the aircraft domain.

SUMMARY OF THE INVENTION

Objects of the present invention are to provide an improved seat such that unhindered and uniform tilt adjustment operation of the entire further seat part, such as a backrest or a leg rest, is achieved and such that, in case of a crash, peak loads occurring can be reliably accommodated by the seat structure of the vehicle seat, also in the form of an aircraft passenger seat. Other objects are to provide a seat with an economical tilt adjustment which is of simple structure.

The foregoing objects are basically achieved by a seat having the drive comprising an actuating means with an actuating part which can be moved lengthwise and which engages an angle drive coupled to the adjustment part and actuating a mechanical coupling. Since there is another angle drive for the other adjustment part, uniform tilt adjustment for another seat part, such as a backrest and/or leg rest, is achieved.

As a result of the mechanical coupling, the indicated seat parts can be uniformly swivelled over their entire width, and consequently, can be adjusted in tilt around a respective common swivelling axis. Unilateral application of force with its adverse effects is avoided. Since, as a result of the uniform application of force by the two adjustment parts and the mechanical coupling between these two parts, torsion forces within the other seat part and its resulting twisting are avoided. A load on the articulation points which form the swivelling axis is also avoided. By these points, the other seat part, such as the backrest or leg rest, is coupled to the actual seat part of the seat. The mechanical coupling allows relief of the actuating means, for example in the form of a servo-drive so that peak loads in case of a crash can be directly accommodated by the mechanical coupling and can be diverted into the seat frame. The present invention is light in structure making its use in aircraft especially efficient. It is moreover economical to produce. As a result of the mechanical approach, low maintenance costs and few failures can be expected.

The actuator means used are economically available commercially and are reliable in operation. In this way, it is possible to convert a small motion of the actuator or servo-drive into a corresponding path of motion for the adjustment part by the indicated angle drive. A uniform and visible tilt adjustment for the other seat part is then achieved. The angle drive allows deflection of the force applied by the actuating part, preferably in the form of an actuating rod of the actuator means in the direction of the adjustment part at almost a right angle. Reliable, dedicated tilt adjustment is possible in spite of the tight installation conditions within the seat frame.

In one preferred embodiment of the seat of the present invention, the mechanical force coupling includes a rigid component hinged to the angle drives. A load situation initiated in a crash, by the adjustment parts, can consequently be reliably accommodated by a rigid component with relief of the actuator. Preferably, the rigid component extends as a mechanical coupling transversely to the lengthwise direction of the seat to keep the base contour of the seat frame clamped. This arrangement distinctly increases the passive safety for the seat.

In another preferred embodiment of the seat of the present invention, the actuator housing is rigidly connected to the seat frame for the seat part or is coupled to the other angle drive. In the latter case, actuation of the actuator leads equally to an adjustment motion of the actuator housing and the actuating rod so that with only one actuating process, by way of these two parts, an adjustment path twice as large for the angle drive can be traversed. Preferably, for reliable operation the actuator housing is rigidly held on the seat frame, and driving for the angle drives with the adjustment parts takes place only by the actuating rod and the mechanical coupling.

The indicated tilt adjustment device can fundamentally be used for all parts of a seat which must be adjusted preferably in their tilt. Use of the tilt adjustment device for tilt adjustment of the backrest of an aircraft passenger seat has been found to be especially advantageous.

The seat configuration of the present invention can also be used as a medical treatment chair in surgery, for dentists, and for application of cosmetics, and the like.

The seat of the invention can be effectively used not only in an aircraft, but also on ferries, cruise ships, busses and the like.

Other objects, advantages and salient features of the present invention wil become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
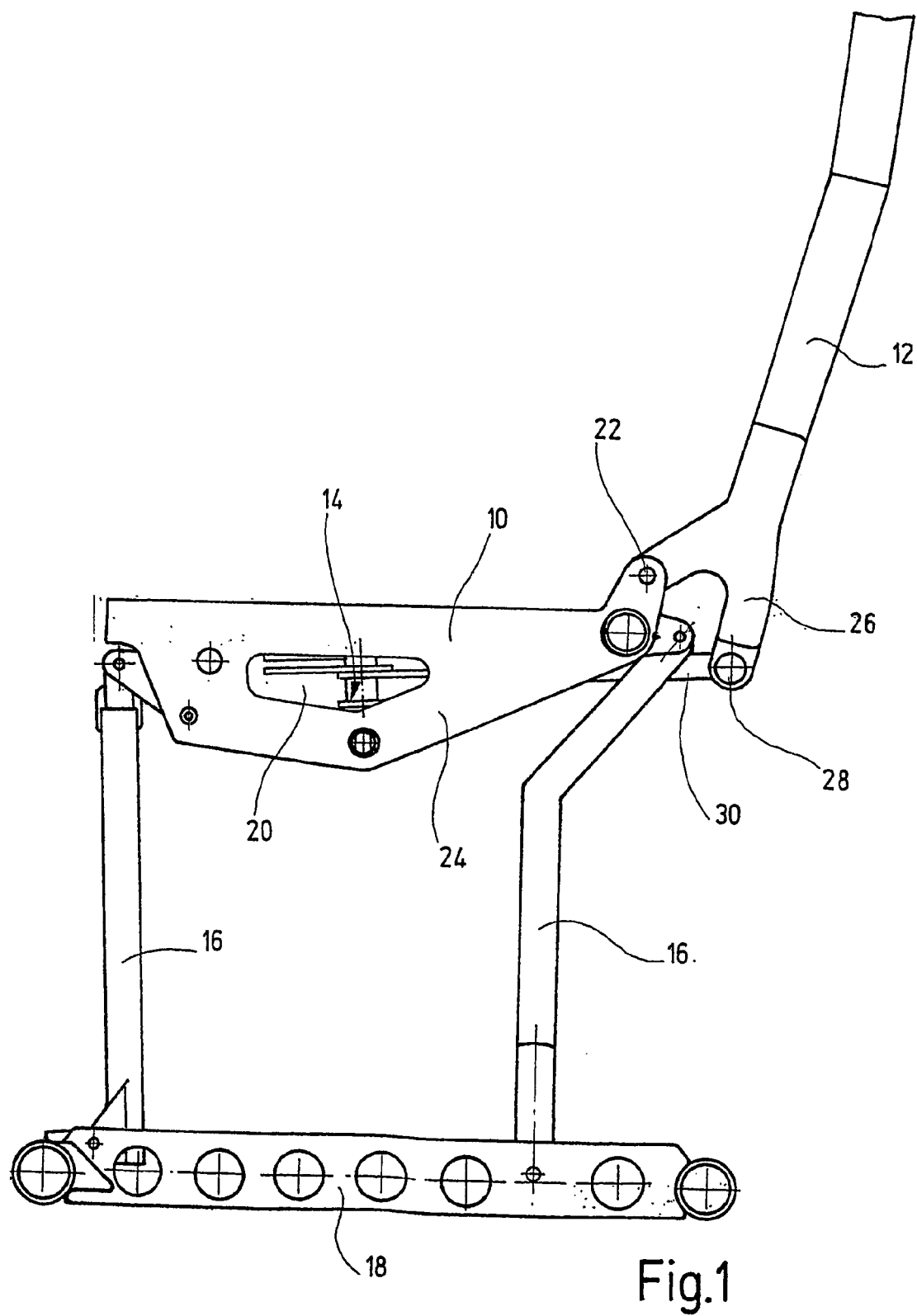
FIG. 1 is a schematic side elevational view of the seat frame of an aircraft passenger seat, without the leg rest and with the backrest mechanism only partially shown, according to an embodiment of the present invention.

The embodiment of the vehicle seat of the present invention shown in FIG. 1 is an aircraft passenger seat, as is conventionally used in airliners for passengers. For better illustration, the cushion parts and the leg rest for the seat occupant are omitted. The aircraft passenger seat has a first seat part 10 and another or second seat part 12 with adjustable tilt in the form of a backrest. The backrest is positioned to be able to swivel an actuating means 14 in its tilt relative to the essentially horizontally extending first seat part 10. The first seat part 10 can in turn be mounted on the vehicle floor by stationary legs 16 using seat rails 18. As illustrated, especially by FIGS. 2 and 3, the pertinent seat structure shown in FIG. 1 is essentially doubled in a successive arrangement, and in this way, constitutes a seat frame 20. The pertinent structure is conventional in aircraft passenger seats and is not described in detail.

Figure 2:
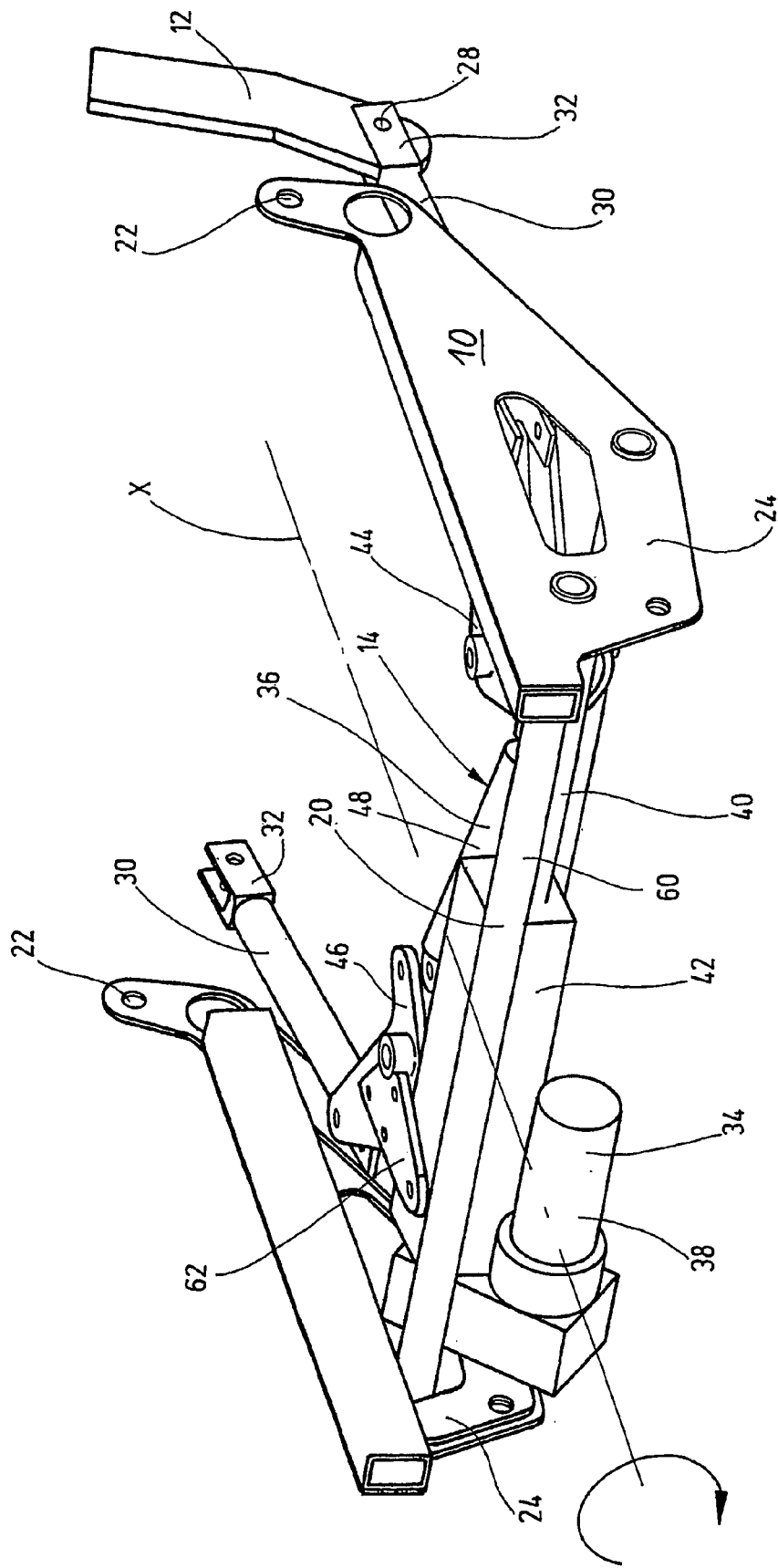
FIG. 2 is a schematic perspective view of a part of the seat frame for the seat of FIG. 1, with a tilt adjustment for a backrest not shown in detail.
Figure 4:
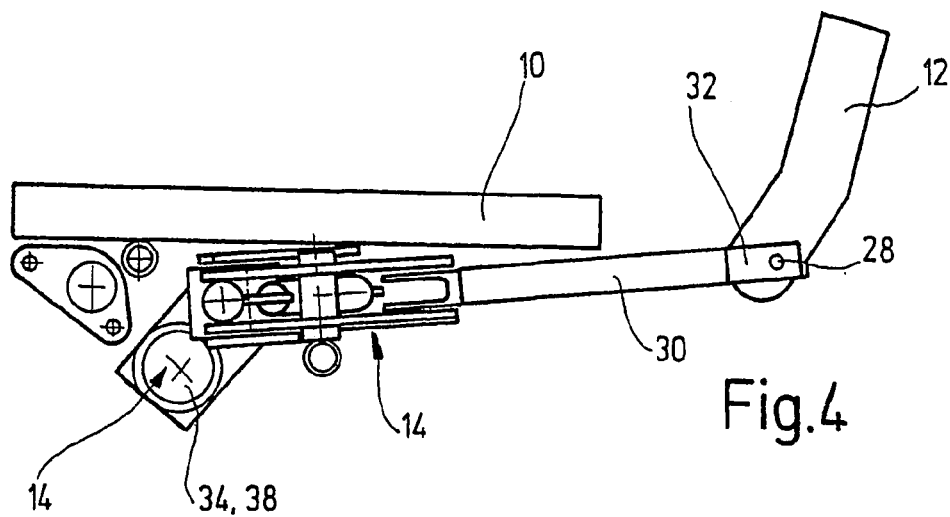
FIG. 4 is a schematic side elevational view of the partial sections of the seat frame in the arrow direction Y shown of FIG. 3.

For tilt adjustment, the backrest 12 with its fittings is positioned to be able to swivel around a swivelling axis 22 supported in the side walls 24 of the seat frame 20. To implement the pertinent support, the backrest 12, with its two fitting parts on the lengthwise sides, has a forked piece 26 (FIG. 1) on its bottom. The free end of one end fork piece is pivotally coupled about swiveling axis 22. The free end of the other fork end piece has a coupling point 28 for triggering the tilt adjustment of the backrest 12 around the actual swivelling axle 22. This structure is described below. For the sake of clarity, FIGS. 2 and 4 show only the fork end piece to the extent it relates to the indicated coupling point 28. In order to further implement a lightweight construction for an aircraft passenger seat, as shown in the figures, the seat rails 18 and the side walls 24 of the seat have the wall pieces which are accordingly recessed, without endangering the structural safety of the seat.

The actuating means 14 has two rod-like adjustment parts 30, with their one free end engaging the other seat part 12 in the form of a backrest by a fork end piece 32 pivotally connected to the coupling point 28 of the respective fitting part for the backrest 12. For greater clarity, FIGS. 2 and 4 each show only one fitting part of the indicated backrest 12 as a further seat part. The arrangement shown in this way also applies comparably to the other fitting part 12 of the backrest of the aircraft passenger seat, which part is not shown in detail.

Figure 3:
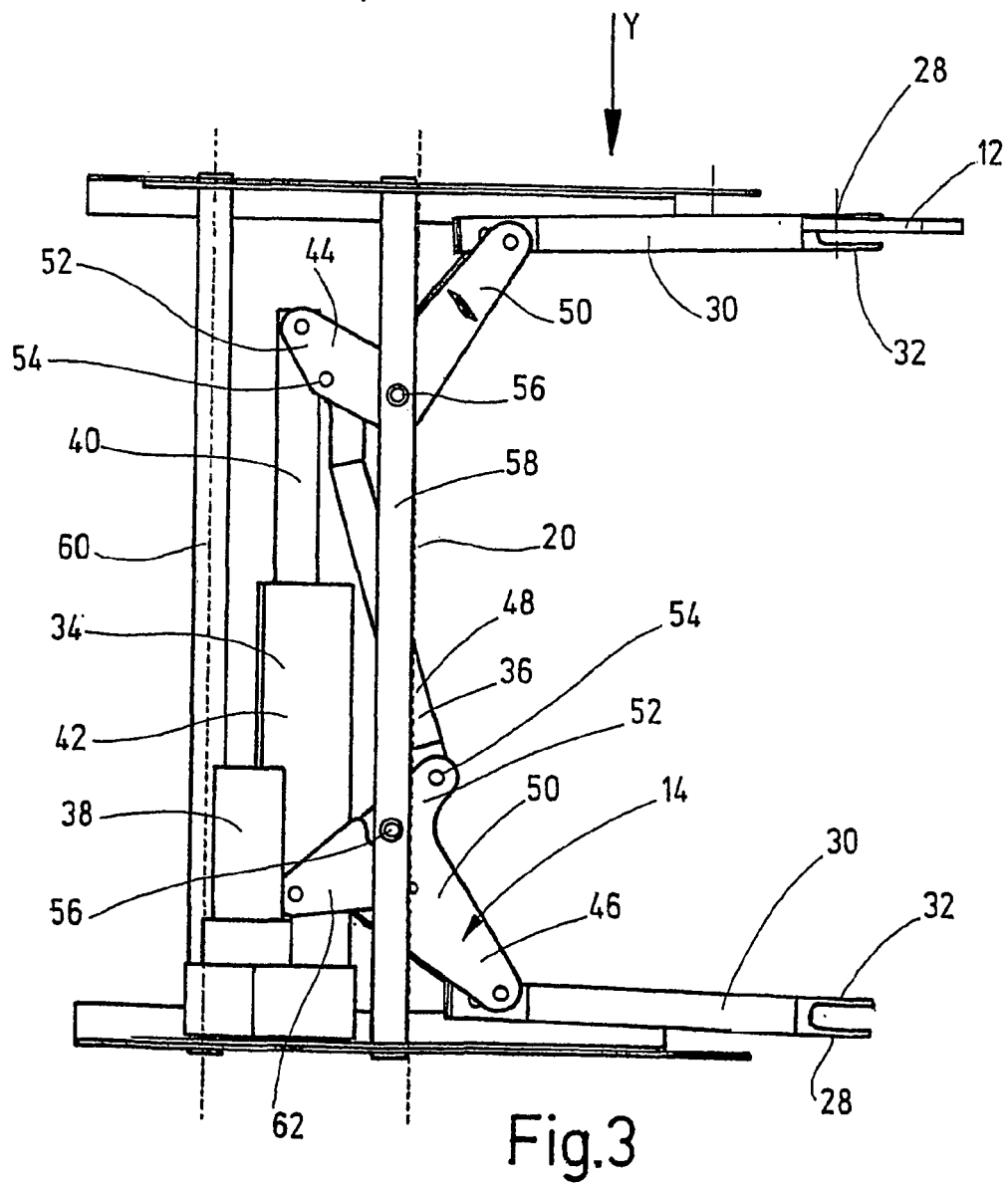
FIG. 3 is a schematic top plan view of the partial sections of a seat frame of FIG. 2, after it has been swivelled clockwise around its lengthwise axis "X" shown by the broken line as indicated by 180°, in the direction of FIG. 2.

The two rod-like adjustment parts 30 can be moved by a common drive 34. For a respective uniform motion of the two adjustment parts 30, a mechanical forced coupling 36 acts between adjustment parts 30. The drive 34 includes a conventional actuator means, not shown in detail, with an actuating rod 40 moveable lengthwise by the drive motor 38 and guided in the actuator housing 42. As FIG. 3 shows, in particular, the actuating rod 40 at its free end engages a first angle drive 44 at one of its free ends in an articulated manner. This first angle drive 44 in turn on its other free end engages the rod-shaped adjustment part 30 in an articulated manner. Furthermore, the angle drive 44 is connected to the already addressed mechanical coupling 36. For the other adjustment part 30, another second angle drive 46 is provided. The mechanical coupling 36 includes a rigid component in the form of a coupling rod 48 hinged by each of its two free ends to the two angle drives 44 and 46. For the sake of clarity, in FIG. 2 the angle drives 44, 46 with the adjustment parts 30 and with the coupling rod 48 are not shown as being connected to one another, in the manner of an exploded drawing. This description also applies to the arrangement shown in FIG. 3, to the extent the two angle drives 44, 46 are not shown joined to the free ends of the two end parts 30, which free ends are located opposite, adjacent to the coupling point 28.

In this embodiment, the actuator housing 42 is rigidly connected to the seat frame 20 for the seat part 10. After actuating the drive motor 38, preferably in the form of an electric motor, the actuator housing 42 is stationary, and the actuating rod 40 can be telescoped depending on the desired direction. In another embodiment, which is not detailed, the free end of the actuator housing 42 can be hinged to the second angle drive 46 so that when the actuator is actuated the two angle drives 44 and 46 are uniformly swivelled towards one another or away from one another. The pertinent, common swivelling motion is achieved for an actuator housing fixed on one side in any case by the mechanical forced coupling 36 in the form of the coupling rod 48. In this respect, synchronous running of the two adjustment parts 30 and consequently smoothly running tilt adjustment for the backrest 12 are achieved.

Each angle drive 44, 46 has two angle arms 50 and 52. One angle arm 50 is coupled to the pertinent adjustment part 30. The other angle arm 52 has an engagement point 54 in articulated form for the coupling rod 48. Between the two arms 50, 52 of each angle drive 44, 46, a swivelling point 56 couples of the respective angle drive 44, 46 to the crosspiece 58 of the seat frame 20. As viewed in FIG. 3, the two angle drives 44, 46 are able to swivel clockwise and counterclockwise around the respective swivelling points 56. The engagement point 54 for the coupling rod 48 in the area of the first angle drive 44 is located between the coupling point of the actuating rod 40 and the swivelling point 56 for this angle drive 44. The actuating means 40 therefore extends, as shown in FIG. 3, protected between the first crosspiece 58 and another crosspiece 60 extending parallel to the first crosspiece 58. The actuator housing 42 is connected to the first crosspiece 58 by a reinforcing angle 62.

For the sake of better understanding, the operation of the disclosed embodiment of the present invention is detailed described. When the seat occupant actuates a corresponding actuating switch to move the backrest 12, back in the direction of a rest position, the occupant starts the electric drive motor 38 and the actuating rod 40 travels linearly into the actuator housing 42 held in the seat frame 20. The first angle drive 44 then swivels counterclockwise around the swivelling point 56 in the first crosspiece 58. The arm 50 pulls back the assigned rod-shaped adjustment part 30, i.e., the adjustment part 30 is moved from right to left as viewed in FIG. 3, so that the coupling point 28 for the fitting part of the backrest 12 is likewise pulled in this direction. The displacement process affects, not only the upper adjustment part 30 as viewed in FIG. 3, but also the lower adjustment part 30. The swivelling motion of the first angle drive 44 counterclockwise presses down the coupling rod 48 as viewed in FIG. 3. By the engagement point 54 on the second angle drive 46, the second angle drive is swivelled clockwise around the respective swivelling point 56. The arm 50 of the second angle drive likewise backs out the lower adjustment part 30 by the pertinent swivelling motion, i.e., the coupling point 28 is likewise moved from right to left. Via the coupling 36 in the form of the coupling rod 48, the two angle drives 44, 46 are forcibly guided in their motion. The pertinent swivelling motion takes place synchronously, and the two adjustment parts 30 are uniformly and smoothly moved back at the same time. The backrest 12 is thereby swivelled around the swivelling axis 22, When the two adjustment parts 30 are pulled into the seat frame, the coupling point 28 is likewise pulled in the direction of the seat frame. The respective fork end piece 32 (of FIG. 1) swivels the backrest 12 as viewed in FIG. 1, clockwise around the swivelling axis 22 into a possible rest position.

To reverse this process, after corresponding actuation of the control switch by the seat occupant, the electric drive motor 38 is shifted into the drive direction. The actuating rod 40 of the actuator is extended. Tthe first angle drive 44 then is swivelled clockwise. By the mechanical forced coupling in the form of the coupling rod 48, the second additional angle drive 46 is swiveled uniformly, but in the opposite direction. In the pertinent adjustment motion, the two rod-shaped adjustment parts 30 are then pushed out of the seat frame and push the fitting parts of the backrest 12, via the respective fork end piece 32, for the raising motion to swivel counterclockwise around the swivelling axis 22 until, for example, an almost upright backrest position as shown in FIG. 1 is reached.

If, in case of a crash, a sudden load is applied to the backrest, by the seat occupant pressing the backrest 12 to the rear, the two adjustment parts 30 are likewise pressed suddenly in the direction of the interior of the seat frame 20. The angle drives 44, 46 are then pushed in opposite directions against one another due to being mutually locked by the mechanical coupling 36 (coupling rod 48). The mechanical parts are designed to be rigid, directly accommodating the sudden crash load, without the load being diverted into the elastic actuator-actuation system. Additionally the tilt adjustment means enables a continuous uniform motion on the two lengthwise sides of the backrest by the respective fitting parts so that torsional warping of the backrest 12 is precluded. The swivelling axis 22 is designed for tilting and is relieved accordingly. The indicated tilt position need not be limited to backrests, but can also be used for example for the leg rest, and optionally for tilt adjustment of the actual seat part 10. In addition to the described electrical actuator means, optionally hydraulically operating actuating means or spindle drives can also be used. Since, in the latter case, for a linear extension motion the actuating rod 40 must then be turned by its screw thread, a corresponding rotary guide must be provided in the area of the coupling point of the first angle drive 44 to be able to convert the rotary motion of the spindle drive directly into swivelling motion for the angle drive 44.

While one embodiment has been chosen to illustrate the invention, it will be understood by those skilled in the art that various changes and modifications can be made therein without departing from the scope of the invention as defined in the appended claims.

What is claimed is:

1. A seat, comprising:
    a seat frame;
    a first seat part mounted on said seat frame;
    a second seat part coupled to said first seat part for tilt adjustment; and
    an actuating device coupled to and adjusting tilt positions of said second seat part, said actuating device having at least first and second adjustment parts engaging said second part, having a common drive mechanism coupled to said adjustment parts for uniformly moving said adjustment parts and having a mechanical coupling acting between said adjustment parts, said common drive mechanism including an actuator with a longitudinally displaceable activating part engaging a first angle drive coupled to said first adjustment part and including a second angle drive coupled to said first angle drive by said mechanical coupling for activating said second angle drive, said second angle drive being coupled to said second adjustment part, each of said angle drives having first and second arms with said first arm thereof coupled to the respective adjustment part and with said second arm thereof having an engagement point coupled to said mechanical coupling, each of said angle drives including a pivot point between said first and second arms thereof pivotally coupling the respective angle drive to said seat frame.

2. A seat according to claim 1 wherein said mechanical coupling comprises a rigid structural component pivotally coupled to said first and second angle drives.

3. A seat according to claim 1 wherein an activator housing is rigidly connected to said seat frame.

4. A seat according to claim 1 wherein an activator housing is coupled to said second angle drive.

5. A seat according to claim 1 wherein said mechanical coupling comprises a coupling rod engaging said second arms of said first and second angle drives, one end of said coupling rod engages said first angle drive between said engagement point and said pivot point thereof.

6. A seat according to claim 1 wherein said pivot points are located on a common crosspiece of said seat frame, said crosspiece extending parallel to an axis extending longitudinally through said actuator and transversely to two side walls of said seat frame, said adjustment parts extending along said side walls.

7. A seat according to claim 6 wherein said adjustment parts comprise adjustment rods having first free ends engaging said angle drives and second free ends engaging fitting parts extending at least partially along longitudinal sides of said second seat part.

8. A seat according to claim 7 wherein said second seat part is a backrest.

9. A seat according to claim 7 wherein said actuator extends between said common crosspiece and another crosspiece of said seat frame, and includes a drive motor.

10. A seat according to claim 6 wherein said actuator extends between said common crosspiece and another crosspiece of said seat frame, and includes a drive motor.

11. A seat according to claim 10 wherein said second seat part is a backrest.

12. A seat according to claim 1 wherein the seat is a vehicle seat.

13. A seat according to claim 1 wherein the seat is an aircraft passenger seat.

14. A seat according to claim 1 wherein said second seat part comprises a backrest.

15. A seat according to claim 1 wherein each of said adjustment parts have opposite ends pivotally coupled to said second seat part and to one of said angle drives.

16. A seat according to claim 1 wherein said activating part is pivotally coupled to said first angle drive.

* * * * *